March 26, 1946.  J. P. TARBOX  2,397,447
METALLIC STRUCTURE
Filed Oct. 19, 1944

INVENTOR
J. P. Tarbox

Patented Mar. 26, 1946

2,397,447

UNITED STATES PATENT OFFICE 2,397,447

METALLIC STRUCTURE

John P. Tarbox, Philadelphia, Pa., assignor to Edward G. Budd Manufacturing Company, Philadelphia, Pa., a corporation of Pennsylvania Application October 19, 1944, Serial No. 559,333

3 Claims. (Cl. 189—34)

The invention relates to closed metallic structures, such as aircraft airfoils and more particularly to means for securing reinforced skin sheets or skin blankets to the internal framework of such structures.

It has heretofore been proposed to secure such reinforced skin structures to the transverse frame members by means of clips overlapping the respective reinforcements and frame members and secured to each.

It is an object of my invention to provide a construction wherein the frame members and reinforcements of the skin themselves are provided with overlapping joint structure through which they may be readily secured together without the use of separate clips, the joint parts being extended at substantially right angles to the skin so that they are readily accessible for joinder by welding tongs or the like.

To this end, integral tabs are struck out and bent at substantially right angles from said frame members, and the reinforced skin sheet to be attached thereto is provided with side walls adapted to overlap with and be secured to the tabs.

Other and further objects and advantages and the manner in which they are attained will be apparent from the following detailed description of an exemplary embodiment of the invention, reference being had to the drawing forming a part of this specification.

Figure 1:
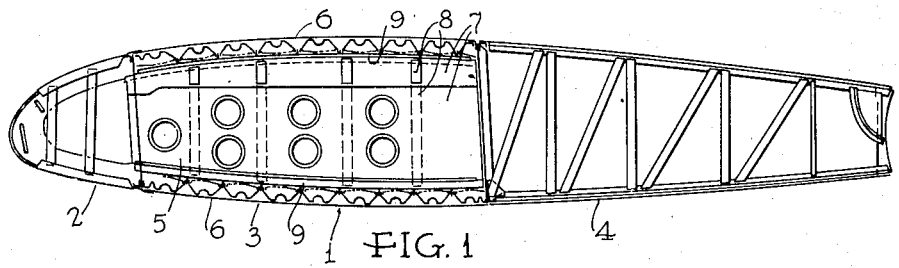
Figure 1 is a diagrammatic sectional view through an airplane wing to which the invention is shown applied.
Figure 2:
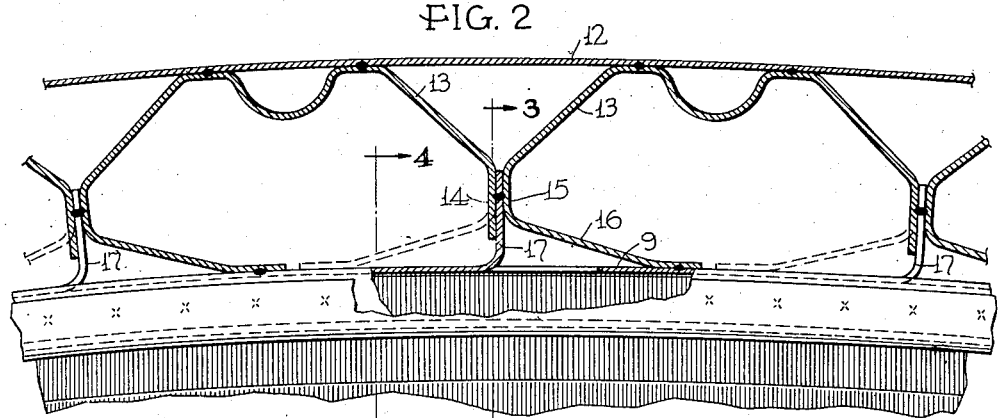
Figure 2 is an enlarged fragmentary detail view showing the manner of attachment of the reinforced skin sheet to the chord of a rib.
Figures 3, 4:
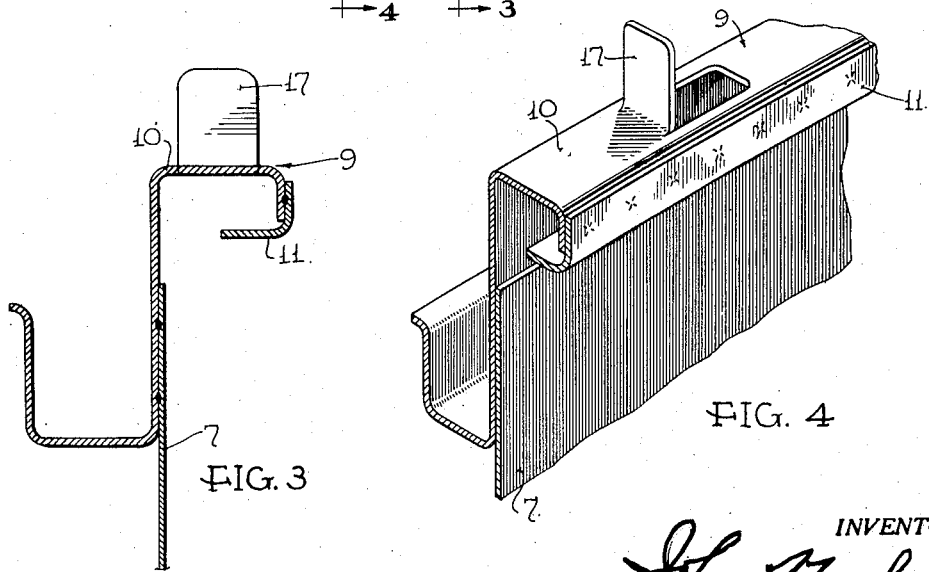
Figure 3 is a fragmentary detail section, the section being taken on the line 3—3 of Figure 2.
Figure 4 is a fragmentary perspective view of a portion of the rib with parts in section, the section being taken substantially along the line 4—4 of Figure 2.

As representative of the application of the invention, the wing 1 of an airplane is shown in Figure 1, the same comprising a leading edge section 2, a central section 3, and a trailing section 4. The central section comprises ribs 5 and reinforced skin sheets or skin blankets 6. The ribs may include bipartite overlapping webs 7 and struts 8 and edge chords or cap strips 9. As shown in Figures 3 and 4, the cap strips 9 here are of angular shape having a relatively wide flange 10 disposed parallel to the skin blanket. The cap strips preferably are Z-shaped and the outer flange 10 may be reinforced by an inturned or outturned strip 11, either integral or welded thereto.

The skin blanket 6 comprises a skin sheet 12 and a plurality of stringers 13. The stringers may have various cross-sectional shapes but one characteristic which is common is that they have at least one wall 14 which is disposed approximately perpendicular to the cap strip 9. One side of the stringers shown herein has such a vertical wall disposed adjacent and in final assembly secured to a vertical wall 15 of an adjacent stringer, the latter wall being extended to form an arm 16 which is directly attached to the outer flange 10 of the cap strip, as by welding.

During formation of the cap strip 9 a plurality of clips or tabs 17 are struck out from the outer flange 10 and turned up at right angles. Their location is determined by the dimensions of the stringers which are to be attached, the tabs being located where they will lie alongside a side wall 14 or 15 or both of the stringers.

When the skin blanket and rib cap strips are brought together the tabs, which now lie alongside the walls 14 and 15 or between them, are welded to these vertical walls. Afterward the arms 16 are welded to the cap strip.

Considerable vertical and longitudinal (of the stringers) adjustment of the skin blanket is permitted before the tab connections are made, the arms 16 being resilient to permit them to be adjusted before welding.

The strips 11 on the cap strips and the arms 16 which are triangulated over the openings left in the cap strip when the tabs are formed, provide adequate strength compensation for the openings.

It is thus seen that the invention provides a very simple and inexpensive yet strong and convenient construction. If desired, of course, tabs may be struck in like manner from a flange of a stringer when it lies alongside and parallel to the top of the cap strip, as does the end of the arm 16 here, to be attached to the side of the cap strip. In all cases the connection of the tab to the adjacent side wall is made by shear means. The uncut metal at the root end of the tab will strongly resist being pulled out, particularly when the parts are made of a very strong tough metal such as cold-rolled stainless steel.

While one embodiment of the invention has been described it is to be understood that there may be various embodiments within the limits of the prior art and the scope of the subjoined claims.

What is claimed is:

1. In a sheet metal structure, a frame member having a flange portion forming an attaching face, tabs cut out along three sides from said face and bent at an angle to said face along the fourth side, a reinforced skin blanket comprising a skin sheet and reinforcing stringers secured to said sheet, said stringers having portions which overlap said tabs on the side thereof and are secured thereto, and at least one side wall of adjacent stringers being extended by a bracing portion projecting from the portion overlapping an adjacent tab and having its end overlapping the attaching face of the frame member and secured thereto.

2. In a sheet metal structure, a frame member having a flange which forms an attaching face, the outer edge of the flange being turned back in a return flange, attaching tabs cut out of said face along three sides and bent at an angle to said face along the fourth side, and a reinforcing strip secured along the length of the return flange and extending away from said attaching face to compensate for the weakening caused by cutting out the tabs.

3. In a sheet metal structure, a first frame member having a thin wall and a flat tab struck therefrom with one edge left integrally united thereto along a transverse line and with its plane parallel to the line of attachment, a second frame member disposed transversely of the first frame member and having a wall disposed alongside a flat surface of said tab and secured thereto, said transverse wall extending at an angle from its connection with said tab and having a portion disposed alongside and secured to the wall of said first member.

JOHN P. TARBOX.